F. W. FOLLETT.
EXPANSIBLE BODY FOR AUTOMOBILES AND OTHER VEHICLES.
APPLICATION FILED MAY 20, 1921.
1,436,984.
Patented Nov. 28, 1922.
6 SHEETS—SHEET 2.
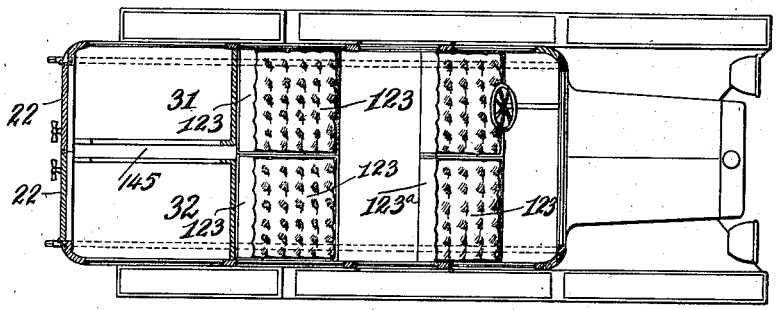
Fig. 5.
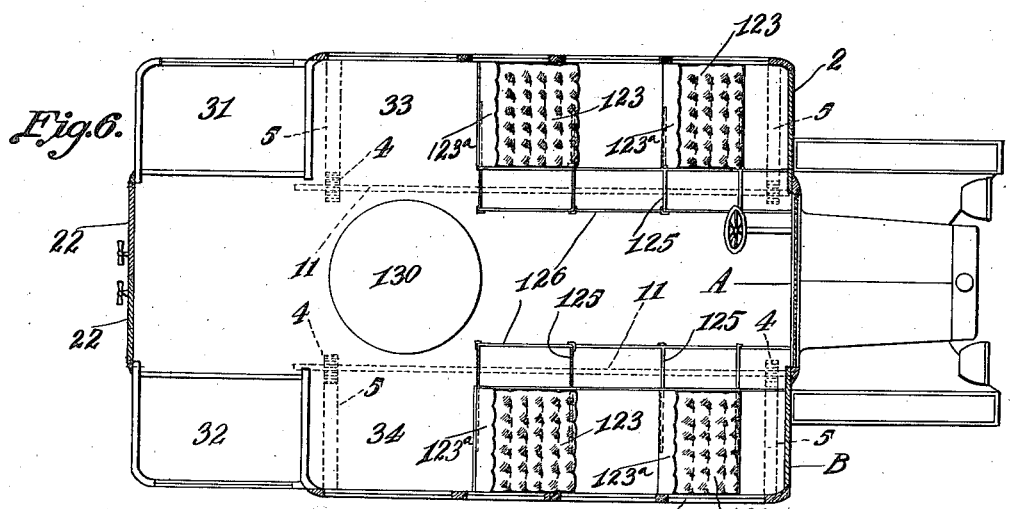
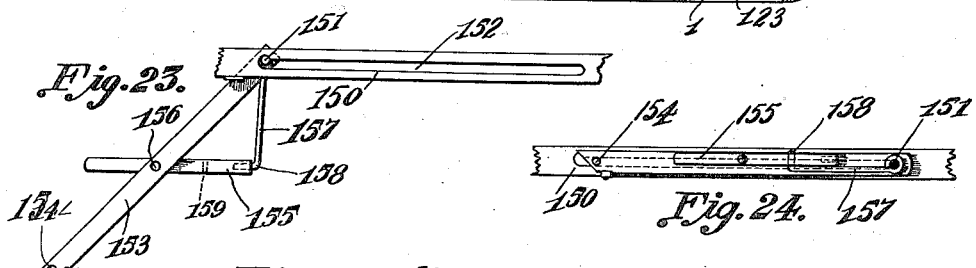
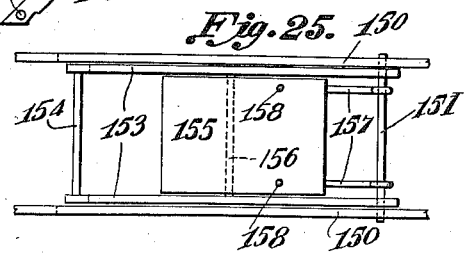
FREDERICK W. FOLLETT
INVENTOR.
BY
*J. W. Milburn*
ATTORNEY.

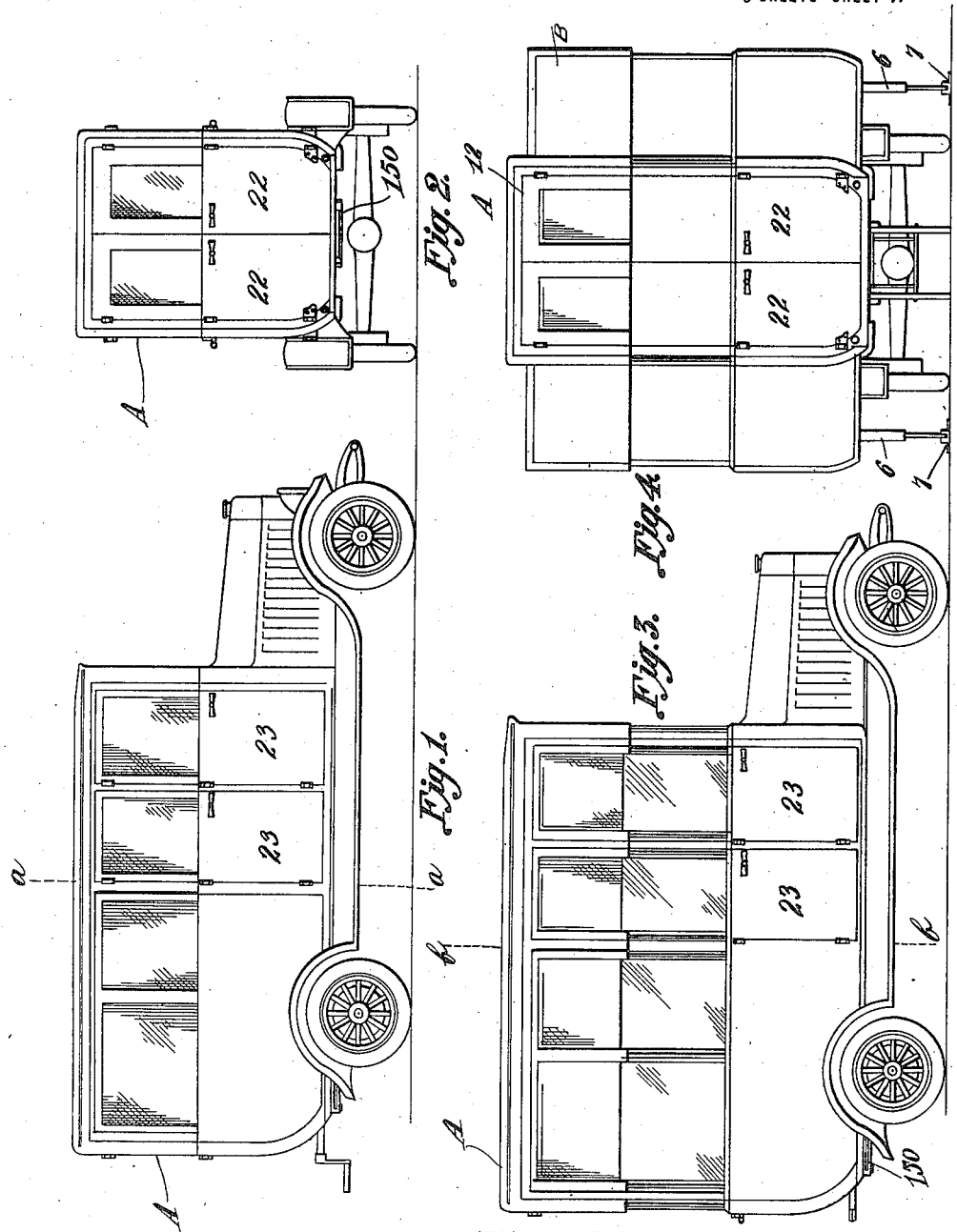

F. W. FOLLETT.
EXPANSIBLE BODY FOR AUTOMOBILES AND OTHER VEHICLES.
APPLICATION FILED MAY 20, 1921.

1,436,984.

Patented Nov. 28, 1922.

FREDERICK W. FOLLETT
*INVENTOR.*

BY

*J. W. Milburn*

ATTORNEY.

F. W. FOLLETT.
EXPANSIBLE BODY FOR AUTOMOBILES AND OTHER VEHICLES.
APPLICATION FILED MAY 20, 1921.
1,436,984. Patented Nov. 28, 1922.
6 SHEETS—SHEET 4.
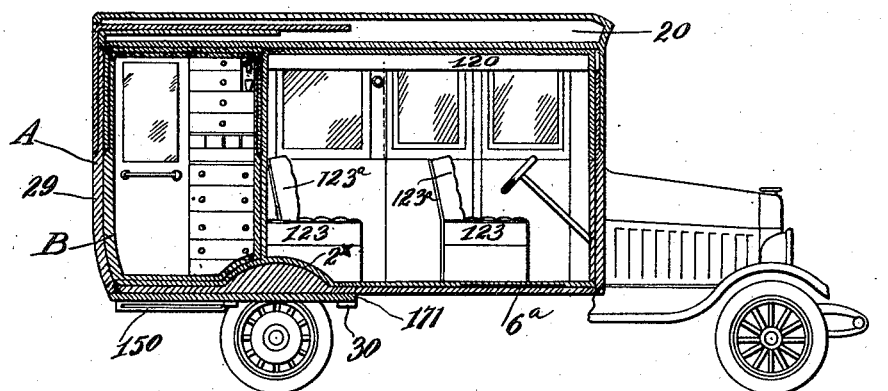
Fig. 11.
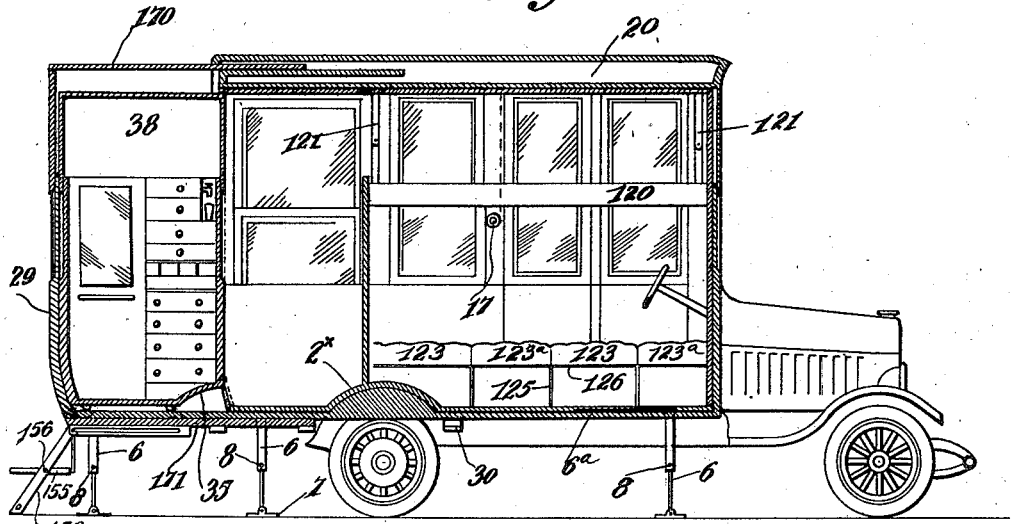
Fig. 12.
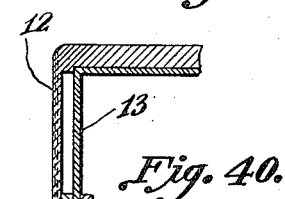
Fig. 40.
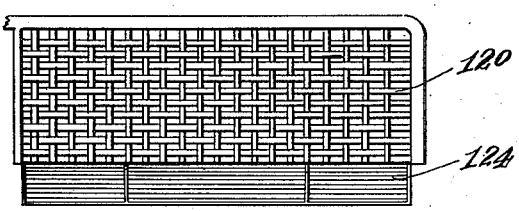
Fig. 29.
FREDERICK W. FOLLETT
INVENTOR.
BY
ATTORNEY.

F. W. FOLLETT.
EXPANSIBLE BODY FOR AUTOMOBILES AND OTHER VEHICLES.
APPLICATION FILED MAY 20, 1921.

1,436,984.

Patented Nov. 28, 1922.
6 SHEETS—SHEET 5.

FREDERICK W. FOLLETT
INVENTOR.

BY
J. W. Milburn
ATTORNEY.

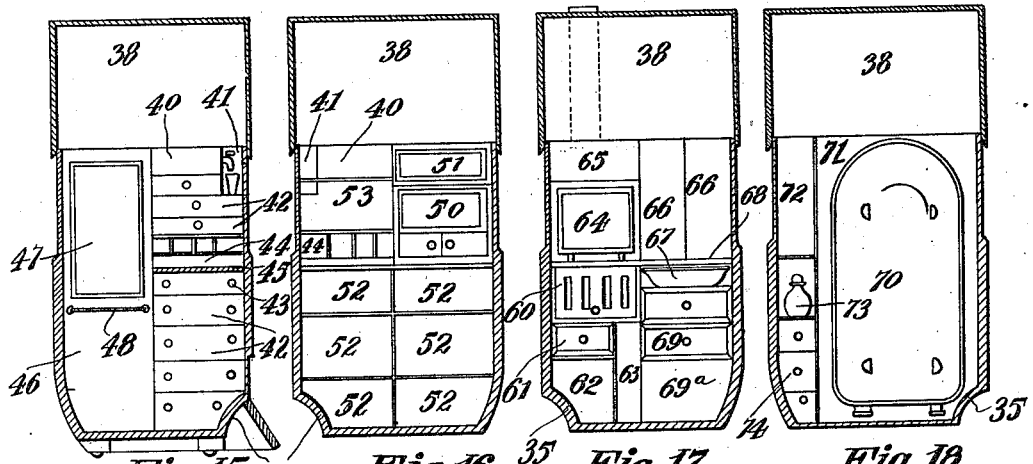

Patented Nov. 28, 1922.

1,436,984

UNITED STATES PATENT OFFICE.

FREDERICK W. FOLLETT, OF WASHINGTON, DISTRICT OF COLUMBIA.

EXPANSIBLE BODY FOR AUTOMOBILES AND OTHER VEHICLES.

Application filed May 20, 1921. Serial No. 471,069.

*To all whom it may concern:*

Be it known that I, FREDERICK W. FOLLETT, a citizen of the United States, and a resident of the city of Washington, in the District of Columbia, have invented certain new and useful Improvements in Expansible Bodies for Automobiles and Other Vehicles, of which the following is a specification.

My invention relates to automobiles, and particularly to expansible bodies for automobiles.

As is well known, great inconvenience has been experienced by persons touring in automobiles by reason of the exceedingly limited space afforded by the ordinary automobile body for camping and for use as living and sleeping quarters, and this has necessitated the carrying of such auxiliary conveniences as trailers, tents, etc.

The objects of my invention are to provide an automobile body which in ordinary use will have substantially the same size and appearance as an ordinary body, yet which is so constructed as to be easily and quickly expanded to a size and shape suitable for use as living quarters. A further object is to so construct the automobile that it may be closed when in expanded condition, and so that it may be heated, if desired. A still further object of the invention is to provide space or compartments in the body for compactly stowing away necessary articles of furniture, clothing, cooking utensils, and countless other articles which would be useful in touring or camping. Provision is also made for connecting together two or more automobiles fitted with my invention so that a suite of communicating rooms may be available, this being of special advantage to parties touring in company and using several automobiles.

Figs. 1 and 2 are, respectively, side and rear elevational views of an automobile embodying my invention, showing the automobile body when not expanded;

Figs. 3 and 4 are similar views of the same automobile, respectively showing the body expanded vertically and laterally;

Fig. 5 is a plan view of the interior of the automobile in unexpanded condition;

Fig. 6 is a similar view, showing the body expanded longitudinally and laterally;

Fig. 10 is a view similar to Fig. 9, of a modified form of the invention;

Fig. 11 is a side view of the automobile shown in Fig. 1, with the side removed to show the interior construction;

Fig. 12 is a view similar to Fig. 11, showing the body extended longitudinally and vertically;

Figures 7, 8:
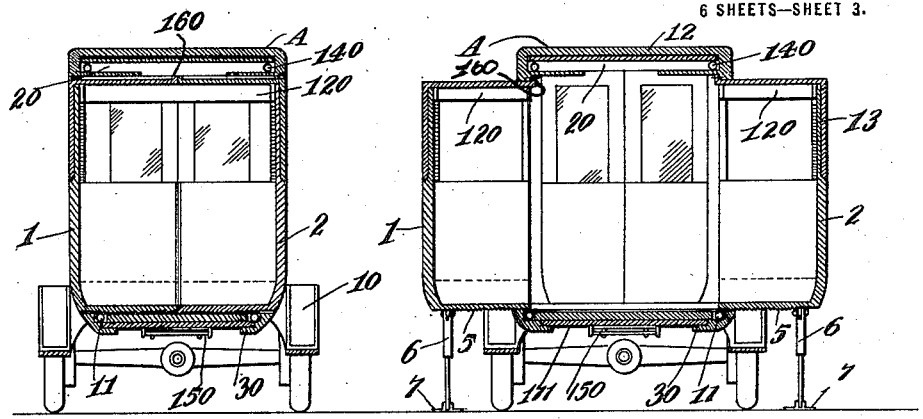
Fig. 7 is a sectional view on line *a—a* of Fig. 1.
Fig. 8 is a similar view, with the body shown in Fig. 7 expanded laterally but not vertically.
Figure 9:
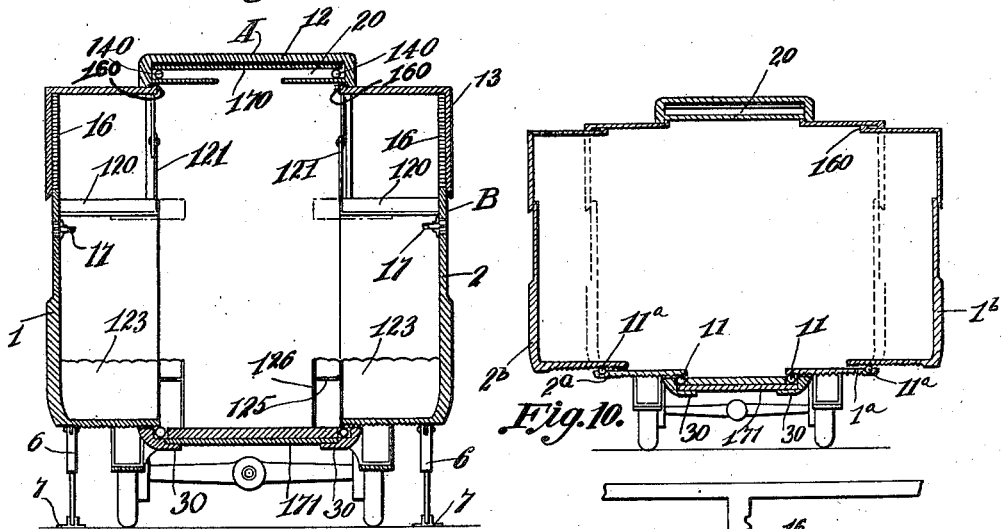
Fig. 9 is a sectional view on line *b—b* of Fig. 3, showing the body expanded vertically and laterally.
Figure 33:
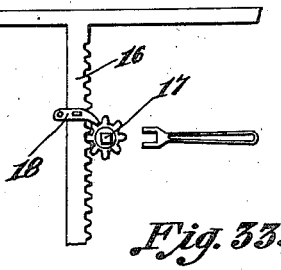
Figure 32:
Figure 13:
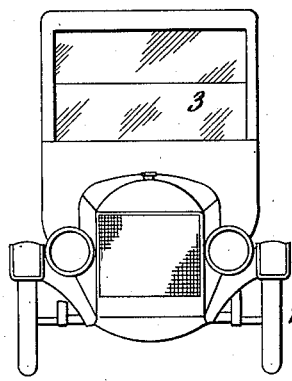
Fig. 13 is a front elevational view of the automobile shown in Figs. 1 and 2.
Figures 26, 27, 28:
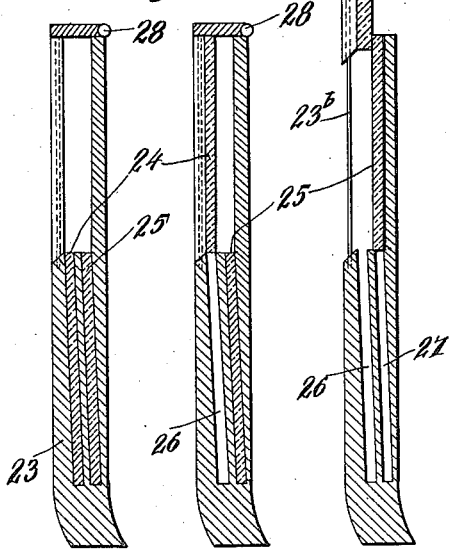
Figures 31, 34:
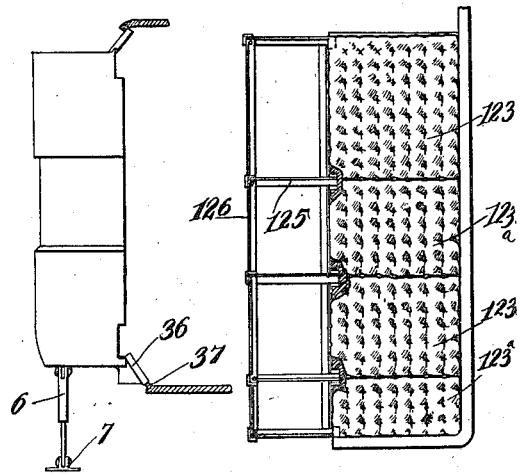
Figure 30:
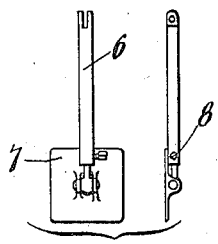

Figs. 15 to 22, inclusive, are detail elevational views of interchangeable sections adapted to be carried by the automobile in the positions shown in Figs. 11 and 12;

Figs. 23 and 24 are side elevational views of the rear step construction shown in Fig. 12, showing the step in operative and folded positions, respectively;

Fig. 25 is a top plan view of the folded step shown in Fig. 24;

Figs. 26, 27, and 28 are enlarged sectional detail views of the expansible door construction, taken on line *c—c* of Fig. 39, Figs. 26 and 27, showing the top down and the window in the door open and closed, respectively, and Fig. 28 showing the top expanded and the window closed;

Fig. 29 is a plan view of the upper berth shown in Fig. 12;

Fig. 30 is a detail view of the adjustable leg shown in Figs. 4, 8, 9, 12, 14, and 31, for supporting the extended sections of the body;

Fig. 31 is a view partly in rear elevation and partly in section, showing a structural detail of the expanded body depicted in Fig. 12;

Fig. 32 is a detail view of the means for effecting lateral expansion of the body;

Fig. 33 is a detail view of the means for expanding the roof;

Fig. 34 is a plan view of the lower berth shown in Fig. 12, parts being broken away;

Figs. 35, 36, and 37 are diagrammatic views illustrating my method of connecting a plurality of automobiles;

Fig. 38 is a similar view, showing the manner of using the side awnings of the car;

Fig. 39 is a side elevational view of the door shown in section in Fig. 28; and, Fig. 40 is an enlarged sectional view of a detail of the end construction of the body, expanded vertically, as in Fig. 12.

The expansible body which forms the subject matter of my invention consists of an outer case A and an inner case B, the latter being divided longitudinally to form two open-ended sections 1 and 2 adapted to be telescoped into the outer case and extended laterally from opposite sides thereof. Proper provision is made in the configuration of the movable sections, as indicated at $2^x$, to permit them to clear the mud guards 10 in the process of expansion. The outward movement of the inner case sections to produce lateral expansion of the body is effected by means of pinions 4, engaging racks 5 on the slidable inner case sections at front and rear, said pinions being carried on rods 11 extending longitudinally of the body and journaled in the outer case. This operating mechanism is preferably provided with a removable handle, but any suitable operating means may be used. If desired, this rack and pinion actuation can be accomplished from inside by means of a small trap door in the floor. The outward movement of the sections is limited by stops 160, by means of which the sections of the inner case are prevented from being wholly withdrawn from the outer case.

When in their extended positions, the sections of the inner case are supported by legs 6, preferably made to be adjustable telescopically and having means 8 for holding them in adjusted position. The legs are pivotally attached to the under side of the inner case, and each has a flat bearing plate 7, pivotally connected to it at its lower end (see Fig. 30). When not in use, these legs are seated in the recesses $6^a$ in the floor of the inner case B.

Both the inner and outer cases are adjustable vertically to enable the height of the body to be increased at will in order to give the body sufficient height for use as living quarters. To this end, each case has at its top portion a telescoping cap or roof portion 12, 13 each slidable vertically over the lower portion of the case of which it forms a part, in a recess 14, 15 provided for the purpose. The raising or lowering of the roof portions 12, 13, is accomplished by means of a rack and pinion, the rack 16 being attached to the roof portion of the inner case and the pinion 17 being journaled on the lower portion of the same case. The parts are held in raised position by a pawl 18, engaging the pinion, and by means of removable bolts (not shown) inserted in registering openings in the inner case and its cap. In order to be more firmly guided in their upward expansion, the telescoping cap or roof portions may run up and down on rods, as shown in the drawings.

In carrying out the lateral and vertical extensions above described, it is preferable to clamp the inner case sections to the outer case when they have been extended as far as desired, after which the roof of the outer case and the roof portions of the inner case may be raised together as a unit by the operation of the rack and pinion. Any suitable form of clamp may be used, the form preferred being removable bolts (not shown) having their heads sunk in recesses in the wall of the inner case.

Figure 14:
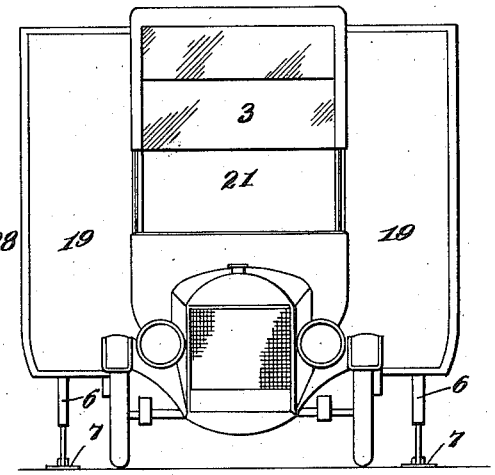
Fig. 14 is a like view of the automobile shown in Fig. 4, expanded laterally and vertically.

Since the inner case sections are open at front and rear, the lateral extension of these sections leaves an opening in the body on each side at front and rear. The front openings may be closed by panels 19, as shown in Fig. 14, which are preferably of wood or other light material, and which when not in use are stored in a loft 20 in the roof of the outer case. No panels are required for the openings at the rear, these openings being closed by the rearward extension of the interchangeable sections 31 and 32.

When the vertical extension is made, the windshield 3 moves upward with the roof portion of the outer case. The opening left by the raising of the windshield is closed by a panel 21, preferably of wood, held in place by clamps or any other suitable means. The glass windshield may also be provided with a curtain similar to those applied to the other windows.

The body is provided with rear doors 22, in the outer case, and side doors 23 and windows 24 in the inner case sections. These doors and windows are divided into upper and lower sections, the upper sections $23^a$ sliding on rods $23^b$ on the lower sections, as shown in Figs. 26, 27, 28 and 39, and moving up and down with the roof of the car. The sections are held in their elevated positions by means of suitable clamps $23^c$ shown in Fig. 39. Each side door 23 has two thick panes of glass 24, 25, either with or without a metal or wooden sash. These panes may be dropped into recesses 26 and 27, respectively, provided in the lower part of the door, or one or both of them may be raised, as shown in Figs. 27 and 28.

When the car is expanded upwardly and it is desired to have the windows closed, the panes are in the position shown in Fig. 28. To open the window, it is only necessary to drop the panes into their respective recesses in the bottom portion of the door.

Each window is provided with a curtain mounted on a roller 28, set in a depression provided therefor at the top of the window.

To provide a larger amount of floor space within the body than is afforded by the lateral extension alone, means are furnished for longitudinal expansion as well. For this purpose, the outer case is provided with a telescopic portion 29, consisting of three parts, viz, a roof board 170, floor board 171, and the rear portion of the outer case. These three parts are bolted together as a unit and are slidable on the outer case in guides formed by the loft 20 at the top and supporting lugs 30 on the under side of the outer case. This extensible portion preferably contains a pair of interchangeable sections 31 and 32, which, when the body is unexpanded, occupy the positions shown in Figs. 5 and 11, and which are first moved outwardly to positions in spaces 33 and 34 (Fig. 6) by the lateral movement of the inner case sections, thence being drawn out by hand rearwardly to the positions illustrated in Fig. 6, this taking place after the rear extension portion 29 has been drawn out. In being thus drawn out, each section 31 and 32 is supported on the floor of the inner case section from which it is extended until it passes out of and beyond the same, running the remainder of the distance on casters or rollers on the edge of the rear extension 29, as shown at 37 in Fig. 31.

Owing to the fact that the bottom of each interchangeable section has a cut-out portion 35 to conform to the configuration of the floor of the inner case section in which it is nested, there is a slight gap in the floor of the car when the section is drawn out rearwardly. To close this opening there is provided a hinged strip 36, which normally is folded up into a recess in the front face of the section 31, 32, but which drops to the position shown in Fig. 31 when the section is drawn out rearwardly and may be clamped in that position, the wheel 37 on this strip also running on the floor board and serving as an additional guide and support for the section 31, 32. After being drawn out, the sliding top 38 of each of these sections is raised and fastened to the roof of the car by hooks or any other suitable means (not shown). In the enclosed space thus provided, shelves may be placed above the sections on lugs inserted for this purpose.

The interchangeable sections (Figs. 15 to 22) are illustrated in eight different forms, but these forms may be varied, as later described. Any one of them may occupy the illustrated position of the section 31, and another the illustrated position of section 32, proper selection, of course, being made according to the needs of the automobilist.

These sections are each individually divisible into two, or more, interfitting units, as hereafter described, each unit constituting a half, quarter, or even smaller portion. Each section, and each separable unit thereof, may be constructed of sheet metal, wood or fibreboard. These separable units allow a wide range of selection to be made in assembling, since they are removable and interchangeable, and therefore afford a large variety of camping conveniences selected according to the requirements of the person using them. In assembling them, however, due attention must be given to whether the units are for right or left hand sections. A few examples of the arrangement and construction of these sections are shown in Figs. 15 to 22, inclusive.

Fig. 15 shows the dresser and wardrobe section, preferably of three units, dividing on a central vertical line and the right half further dividing on a central horizontal line. The dresser unit of Fig. 15 has a water cooler 40 at the top and a recess 41 for a drinking glass, access to this portion of the section from the body of the car also being possible through a small door (not shown) in the wall of the section. Below the water tank are several drawers 42 suitable for clothing, a lavatory 43 which sets in or occupies one of the drawer spaces, and a desk 44 with an extensible writing board. Hot and cold water may be supplied to the lavatory by a rubber hose from a cooking section on the opposite side of the car. The wardrobe unit 46 has a mirror 47 in the door, also a towel-rack 48 that folds up out of the way.

Fig. 16 shows the bookcase and phonograph section which consists of four units. The phonograph 50 occupies the upper right hand quarter and has a case 51 for records above it. Underneath are recesses 52, for books. The upper left hand unit has a water cooler 40, such as shown in Fig. 15, a recess 53 for books and a writing desk 44.

Fig. 17 shows the cooking section, consisting of four units. The lower left hand unit contains a range or kerosene stove 60, enclosed in suitable heat insulation and having a plurality of openings with lids capable of being clamped on them. Below the range is a drawer 61 for various utensils and a drawer 62 for fuel. To the right is a small compartment 63 for a pump and a coil of hose. Above the range is an oven 64 into which a fireless cooker may be nested when not in use. When it is desired to use the top of the range for cooking, the oven and fireless cooker are removed and a stove pipe is placed on the rear and extended out through an opening in the roof (not shown), closed by a screw cap or similar device when not in use. The hot water tank 65 is located over the oven and may be connected with the range by suitable pipes for heating.

The upper right hand unit has two compartments 66 for nested kettles, kitchen utensils and food bags. When these compartments are emptied and the partition between them removed, the table top 68 may be used or, if the latter is drawn out, access may be had to the sink 67. Under the tank are drawers 69 and an ice box 69ª.

Fig. 18 shows the bath tub section, comprising a single unit. The bath tub 70 stands on end in compartment 71, and is hinged at its bottom so that it can be lowered to set on the floor of the rear extension 29 of the car. To the left of the bath tub are drawers 74, water tanks 72, and an oil burner 73 for heating the water.

Fig. 19 shows a section consisting of a rod and gun cabinet and folding boat receptacle, the compartment 80 being for rods and guns, a drawer 81 for shells, and 82 indicating a minnow tank. Compartment 83 is intended to accommodate a small folding boat with oars, seats, etc.

Fig. 20 shows the water closet section, which expands to full height and has none of the overhead shelving used in connection with the other units. This unit is adapted to be taken out and set on the ground, being steadied by guy ropes at each corner. Extensible brackets attached to the section support curtains which give additional room inside and entire privacy. The unit has the usual seat 90, water tank 91, washbowl 92 and box 93.

Fig. 21 shows the photographic dark room section, which is adapted for developing and printing. This unit also occupies an entire section. It has a folding stool 100, a table 101, and a removable partition having a white light 102 on one side and a red or yellow light 103 on the other. Two doors at the top pull out and drop down to close either side in order to render it light-tight when desired. Various drawers and pigeon holes 104 are provided for supplies. Curtains may be hung about this section to keep out all white light.

Fig. 22 shows the pantry and storage section of four or more units, and made up of drawers 110 for clothing, food, supplies, etc.

In equipping the expansible car for living quarters, it is, of course, desirable that adequate sleeping accommodations be available. To this end, I provide four sleeping berths, two upper and two lower. The upper berths 120, preferably of metal slat construction, are clamped overhead to the roof when the car is in normal or unexpanded condition, being dropped down and hung on suitable supports 121 when their use is desired. The width of the berth may be increased by means of a slidable extension 124. The lower berths are converted from the seats 123. The upholstered backs 123ª of the seats are taken off and set in the space between and adjoining the seats, resting on lugs projecting from the seats for this purpose. To increase the width of the berths thus formed, there are provided extension rods 125 with supporting legs, which rods may be pulled out laterally and connected together and with the sides of the car by telescopic longitudinal rods, said rods 126 sliding in and out of the end portion of rods 125 in a manner not shown in the drawing. On these rods are placed additional upholstered sections which give the necessary width, these upholstered sections being normally retained underneath the seats.

In addition to the sleeping berths just described, other articles of furniture may be provided, such as folding chairs and a table 130, which, when the car is in normal unexpanded condition, may be restored in the space 145 between the sections 31 and 32.

When the car is expanded laterally (see Fig. 6) and the sections 31 and 32 are being moved outwardly, the rear doors 22 are accessible from the interior of the car and may be used for entrance or exit. For convenience, an adjustable step 150 is provided in connection with this opening, the step being hingedly attached to the floor of the rear extension 29 and then pulled out into operative position (Figs. 4, 12 and 23) when the rear extension is pulled out, the step being at other times folded up into the position shown in Figs. 2, 3, 11, 24 and 25.

When the quarters afforded by the extended car are still not sufficiently commodious, tent accommodations may be made use of in connection with the car. This is accomplished by rolling an awning 135 upon a spring roller 140, located in loft 20 on each side of the car. The awning may be pulled out through slots (not shown) in the roof portion of the outer case, on each side and its ends secured in any suitable way, for instance, as shown diagrammatically in Fig. 38.

As will be seen in Fig. 10, by the use of a plurality of telescopic sections 1ª, 1ᵇ and 2ª, 2ᵇ, instead of the single sections 1 and 2, a double, triple or even greater extension can be accomplished, thus increasing the size of the expanded car to any desired extent. The description of the single lateral extension shown in the other figures is regarded as sufficient, however, to disclose the principle involved in my invention, the manner of extension of the structure shown in Fig. 10 being similar to that of the more simple construction illustrated.

The stops 160 shown in Fig. 10 on the top of the telescoping sections limit their outward movement and retain them in telescopic connection with one another and with the outer case within which they are fitted.

In Fig. 35, I show my method of connecting one or more pairs of cars with their rear ends together to form connecting compartments. The roofboard 170 and the floor board 171 are first unbolted from the back of the car and drawn out a short distance farther, and then re-bolted. The cars are then backed together, as shown in Fig. 35, the adjustable legs are set in position and side curtains (not shown) are fastened to the roof and floor boards, forming a covered passageway long enough to permit the rear doors 22 of each car to be opened to establish communication between the interiors of the cars.

In Figs. 36 and 37 is depicted the means by which two or more cars, either expanded or unexpanded, may be similarly connected side by side instead of end to end. A removable floor plate 172 is bolted to the bottom of each car beneath one of its side doors. A similar plate 173 is fastened in position bridging the gap between the cars and directly above plate 172. If desired, curtains may be attached to the sides of the passageway thus formed.

What I claim is:

1. An expansible body for vehicles comprising a stationary section and movable extension sections adapted to be moved outward telescopically from each side, an extension section adapted to be moved outward telescopically from the rear of the body, and means for upwardly expanding said stationary section and said extension sections to increase the height of the body.

2. An expansible body for vehicles, comprising an outer case and an inner case, the inner case consisting of sections normally fitting within the outer case and adapted to be expanded laterally therefrom, said outer and inner cases being also capable of vertical expansion to increase the interior dimensions of the body.

3. An expansible body for vehicles comprising an outer case and an inner case, the inner case consisting of sections normally fitting within the outer case and adapted to be expanded laterally therefrom, said outer and inner cases being also capable of vertical expansion to increase the interior dimensions of the body, and means for effecting such lateral and vertical expansion.

4. In a vehicle, a body comprising an outer case and an inner case telescopically fitted therein, each case having a cap or roof portion adapted to be extended upwardly to increase the interior dimensions of the body.

5. In a vehicle, a body adapted to be expanded laterally and upwardly to increase the interior dimensions of the body to a size sufficient for use as sleeping quarters, a bed within the body removably supported from the upper part thereof and adapted to form an upper berth, and seats within the body having removable and adjustable sections adapted to form a bed or lower berth, each of said beds being provided with laterally extensible sections to increase its width.

6. In a vehicle, a body adapted to be expanded upwardly to increase the interior dimensions of the body to a size sufficient for use as sleeping quarters, and a bed within the body removably supported from the upper part thereof.

7. In a vehicle, a body comprising telescoping sections adapted to be extended laterally and rearwardly to increase the dimensions of said body, and interchangeable sections in the rearward portion of the body, each of said interchangeable sections being composed of separable units, substantially as described.

8. In a vehicle, a body comprising telescoping sections adapted to be extended laterally, rearwardly, and upwardly to increase the dimensions of the body, and interchangeable sections in said telescoping sections capable of being divided into separable units interfitting into said interchangeable sections, said units being capable of being withdrawn from said interchangeable sections and reassembled in different relative positions, substantially as described.

9. An expansible body for vehicles having a lower section and an upper section telescopically fitted on said lower section and adapted to be moved upwardly to increase the height of the body, the sections being provided with doors having telescoping sections adapted to be extended upwardly with the walls of the upper body section.

10. An expansible body for vehicles having a lower section and an upper section telescopically fitted on said lower section and adapted to be moved upwardly to increase the height of the body, the sections being provided with doors and windows formed of telescoping sections adapted to be extended upwardly with the walls of the upper body section and to be raised or lowered independently of said body section.

11. An expansible body for vehicles comprising a stationary section and movable extension sections adapted to be moved outwardly from each side of the stationary section, each of said sections being likewise capable of upward expansion.

12. In a vehicle, a body comprising a stationary section and laterally extensible sections, and compartments telescopically fitted in said laterally extensible sections and adapted to be extended rearwardly therefrom to increase the interior dimensions of the body.

13. In a vehicle, a body comprising an outer case section and an inner case section telescopically fitted therein, each case having a cap or roof portion adapted to be extended upwardly, the sections being provided with doors and windows formed of telescoping sections and adapted to be expanded upwardly with the walls of the body sections.

14. An expansible body for vehicles, comprising an outer case and a plurality of inner cases, the inner cases consisting of sections normally fitting within each other and within the outer case, said inner cases adapted to be expanded outwardly therefrom and also adapted to be expanded upwardly to give increased height and capacity to the interior of the vehicle.

15. An expansible body for vehicles comprising an outer case and a plurality of inner cases, the inner cases consisting of sections normally fitting within each other and within the outer case and capable of lateral expansion from the outer case to give substantially double, triple, or greater size, said cases having extension sections adapted to be moved outwardly from the rear of the body, and extension sections adapted to be moved upwardly to increase the height of the body.

16. In a vehicle, a body comprising an outer case section and a plurality of inner case sections telescopically fitted therein, the inner case sections being capable of expansion from the outer case to give substantially double, triple, or greater capacity to the body of the car, each of said sections having a cap or roof portion adapted to be extended upwardly, said sections having in their walls doors and windows each formed of sections, said door and window sections being capable of sliding upon each other telescopically so as to expand or spread with the upward expansion of the cap or roof portion of the vehicle, said door and window sections being provided with panes of glass and having recesses adapted to receive said panes of glass whereby the doors and windows may be kept closed, open, or in partly open condition when the body of the vehicle is in either expanded or unexpanded condition.

17. In a motor vehicle, a body comprising a lower section and an upper section telescopically fitted thereon and adapted to be expanded upwardly to increase the height of the body, said sections having in their walls doors and windows formed of telescopic sections adapted to expand or spread with the upward expansion of the body, said window sections being provided with panes whereby the windows may be in closed, open, or partly open condition when the body of the vehicle is expanded.

18. In an expansible body for vehicles comprising movable extension sections capable of being expanded laterally, rearwardly, and upwardly to a size sufficient for use as sleeping quarters, beds within the body removably supported from the upper part thereof and adapted to form upper berths, said upper berths having extensible sections slidingly adjustable to increase their width, and seats within the body having removable and adjustable sections adapted to form beds or lower berths, said lower berths being provided with laterally extensible rods and supporting legs depending therefrom, said rods being provided with additional bed sections adapted to give lateral extension to said lower berths for the purpose of increasing their width.

19. In a vehicle, a body comprising telescoping sections adapted to be extended laterally, rearwardly, and upwardly to increase the capacity of said body, and interchangeable compartments in the rearward portion of said body, said compartments being capable of expansion from the body and being composed of separable units, said units being removable and adapted to be assembled in different relative positions, substantially as described.

20. In a vehicle, a body having a telescoping section adapted to be expanded rearwardly to increase the capacity of the body, and interchangeable compartments in the rearward portion of the body, said compartments being capable of expansion from the body and being composed of separable units.

In testimony whereof I affix my signature.

FREDERICK W. FOLLETT.